United States Patent [19]

von Koch

[11] Patent Number: 4,702,503
[45] Date of Patent: Oct. 27, 1987

[54] COUPLING BETWEEN AT LEAST TWO MEMBERS TO BE SUBJECTED TO HIGH THERMAL STRESS

[75] Inventor: Arwed von Koch, Stuttgart, Fed. Rep. of Germany

[73] Assignee: Daimler-Benz Aktiengesellschaft, Stuttgart, Fed. Rep. of Germany

[21] Appl. No.: 735,579

[22] Filed: May 20, 1985

[30] Foreign Application Priority Data

May 18, 1984 [DE] Fed. Rep. of Germany ....... 3418473

[51] Int. Cl.⁴ .......................................... F16L 23/00
[52] U.S. Cl. .................................... 285/330; 285/412; 285/913; 285/905
[58] Field of Search ................. 285/330, 913, 24, 412, 285/905

[56] References Cited

U.S. PATENT DOCUMENTS

1,307,160  6/1919  Stokes ............................. 285/330 X
1,514,052  11/1924  Kaiser .................................. 285/330
2,475,057  7/1949  Shaber ............................. 285/330 X

*Primary Examiner*—Thomas F. Callaghan
*Attorney, Agent, or Firm*—Barnes & Thornburg

[57] ABSTRACT

A coupling is provided wherein each of two members to be coupled are provided with a series of centering elements for preventing decentering of the two members during periods of thermal change. Inner and outer centering elements are provided on each member, each element having centering surfaces extending radially and transversely relative to contact surfaces of the members to be coupled. The centering elements of one member contact the centering elements of the other member only at their centering surfaces, thereby allowing for thermal expansion toward other surfaces of the elements without deformation of adjacent elements. Additional decentering arrangements are disclosed for coupling flat members. The couplings disclosed are particularly advantageous for coupling metal to ceramic.

31 Claims, 12 Drawing Figures

COUPLING BETWEEN AT LEAST TWO MEMBERS TO BE SUBJECTED TO HIGH THERMAL STRESS

BACKGROUND AND SUMMARY OF THE INVENTION

The present invention relates generally to a coupling between at least two highly stressed bodies, such as pipes, rings, disks, plates and similar articles, and more particularly to a coupling having centering means for maintaining alignment of the thermally stressed bodies.

In the case of known flanged joints between two pipes with different coefficients of thermal expansion which abut on the front side, axial clamping is effected by screws and clamping devices which are applied to flange surfaces of one or the other pipe in a plane determined by the abutting surfaces of the two pipes. Such an arrangement is disclosed in German DE-AS No. 11 86 703. In the case of an unequal thermal expansion of the two pipes, such a flanged connection prevents a separation and thus a leaking of the two pipes at the abutting surface.

However, in the case of a thermal expansion of the pipe which also takes place in radial direction, such a flanged connection cannot prevent the pipes from decentering. In some types of application, this causes considerable problems.

An objective of this invention is the provision of a coupling which prevents a decentering of the longitudinal axes of the bodies that are connected with one another, when a thermal expansion of the bodies takes place.

Another objective of this invention is the provision of coupling means adaptable to a wide variety of members to be coupled.

Yet another objective of the invention is the provision of a coupling which may be composed of several different materials having different coefficients of thermal expansion.

These and other objects of the present invention are achieved by providing each of two members to be coupled with a series of centering elements for preventing decentering of the two members during periods of thermal change. Inner and outer centering elements are provided on each member, each element having centering surfaces extending radially and transversely relative to contact surfaces of the members to be coupled. The centering elements of one member contact the centering elements of the other member only at their centering surfaces, thereby allowing for thermal expansion toward other surfaces of the elements without deformation of adjacent elements. Additional decentering arrangements are disclosed for coupling flat members. The couplings disclosed are particularly advantageous for coupling metal to ceramic.

Other objects, advantages and novel features of the present invention will become apparent from the following detailed description of the invention when considered in conjunction with the accompanying drawing.

DETAILED DESCRIPTION OF THE DRAWINGS

Figure 1:
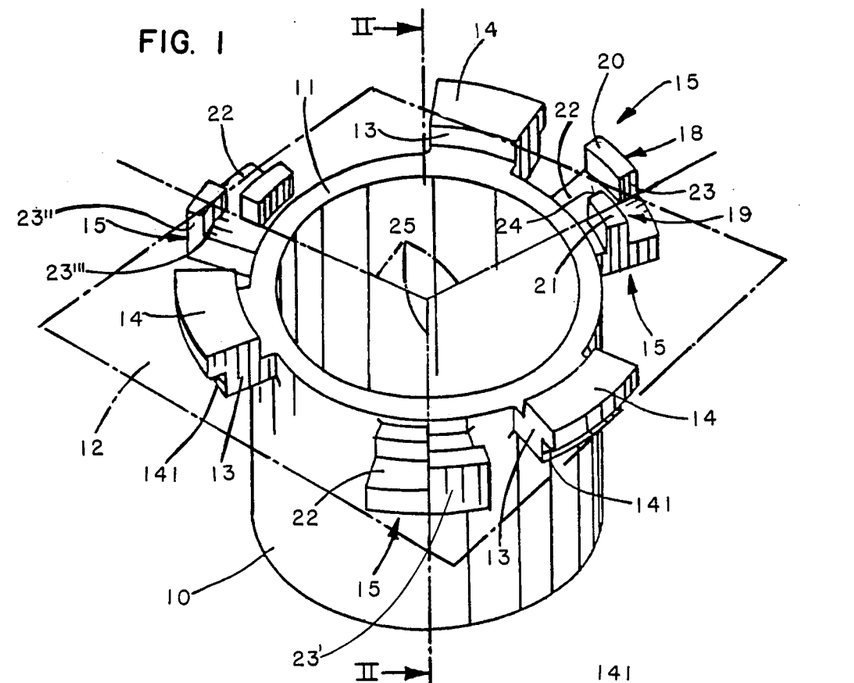
FIG. 1 is a perspective view of a pipe exhibiting a coupling in accordance with the present invention.

The pipe 10, shown in FIG. 1, is an example of a coupling between two bodies that are subjected to high temperatures during operation. It is to be coupled with an identically designed pipe that may consist of the same or a different material. For reasons of simplicity, the second identical pipe is not shown. The two pipes are to be placed on top of one another in alignment with one another in such a way that the two contact surfaces, reference number 11 for pipe 10, abut in a joint plane 12 indicated in FIG. 1, and the longitudinal axes of each pipe coincide. The two pipes are clamped together in the axial direction, and therefore at a right angle to plane 12.

Figure 11:
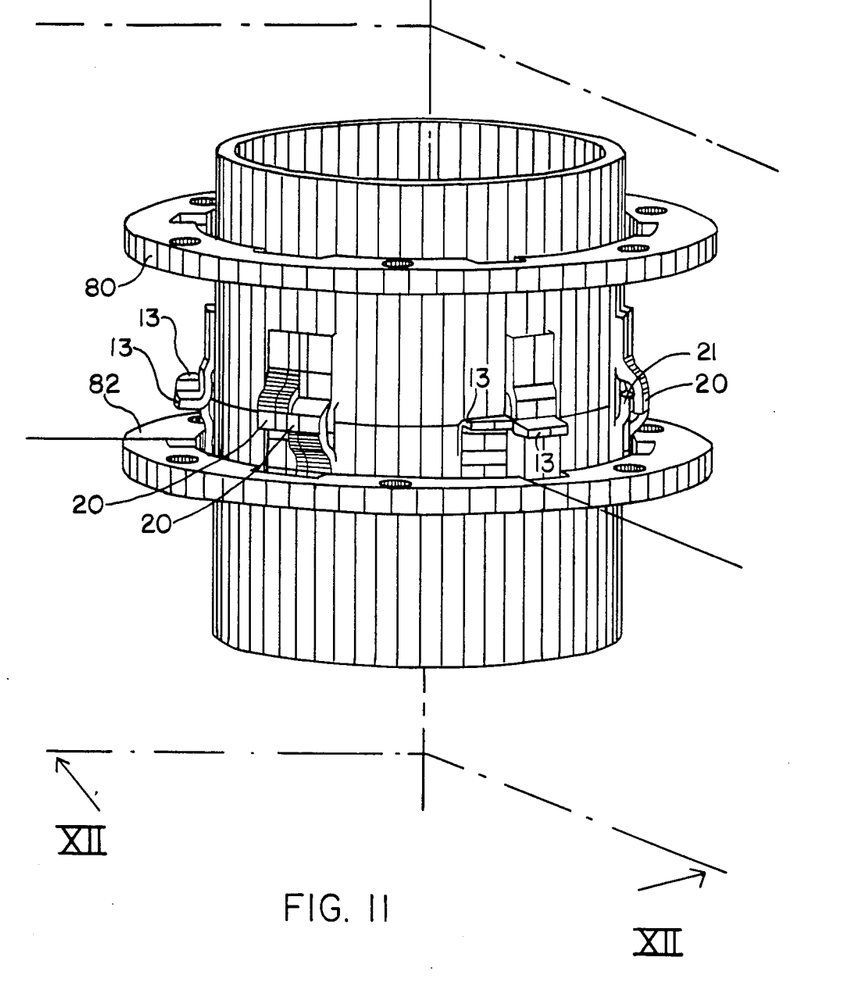
FIG. 11 is a perspective exploded view of a pair of couplings mated with a clamping device.
Figure 12:
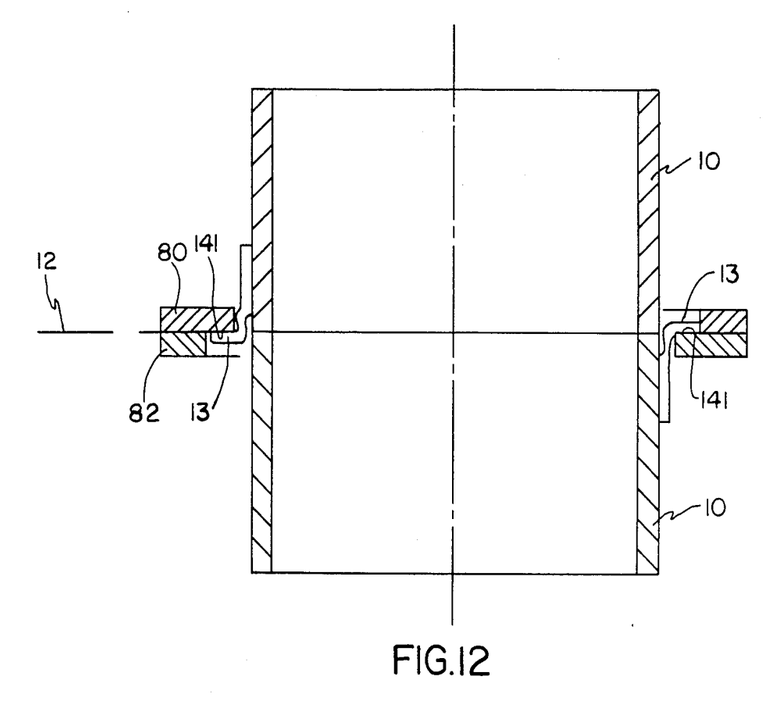
FIG. 12 is a cross-sectional view taken along the lines XII—XII of FIG. 11.

At each pipe, the coupling has three identically designed flange elements 13 arranged at the circumference and staggered by 120°. In the direction of the outer rim, these elements project like steps from the contact surface 11. The projections 14, in this case, are designed in such a way that the lower surface 141 of the projections 14 facing the pipe 10 are located precisely in the plane 12. When the pipes are abutted as illustrated in FIGS. 11 and 12, two flange elements 13, which are part of different pipes, are placed against one another with tangential play in the circumferential direction so that all flanks 141 are located in the plane as 12. At one lower surface 141 of two flange elements 13 located next to one another which are each part of one of the two pipes to be coupled, a shoulder of a screwed or clamped connection 80, 82 is applied. By means of the screwed or clamped connection 80, 82, the contact surfaces 11 of both pipes are pressed against one another. By means of the described design of the flange elements 13, the application surfaces of the screwing or clamping device 80, 82 at both pipes are located in the plane 12, as illustrated in FIGS. 11 and 12, so that the clamping, in a known manner, has a clamping length of "zero". Thermal expansions of the pipes, even in the case of pipes made of materials with different coefficients of thermal expansion, do not result in the separation of the pipes in the region of the plane 12. When a sealing means, such as a gasket, is placed between the two contact surfaces, the connected pipes are perfectly leakproof at the joint even in the case of large fluctuations of temperature.

In order to also avoid a decentering of the pipes when thermal expansion occurs, the connection has a two-part centering device 15 acting between the pipes. Each part of this centering device is designed identically and arranged on a pipe to be connected. In the following description, only the part of the centering device 15 arranged on the pipe 10 is described. The same applies to the other part of the centering device 15 arranged on the other pipe to be coupled to pipe 10.

Figure 2:
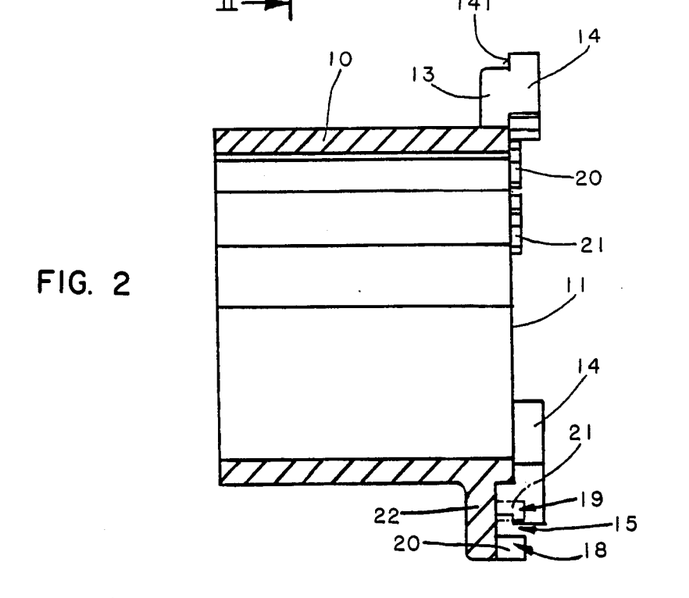
FIG. 2 is a section along Line II—II in FIG. 1.
Figure 3:
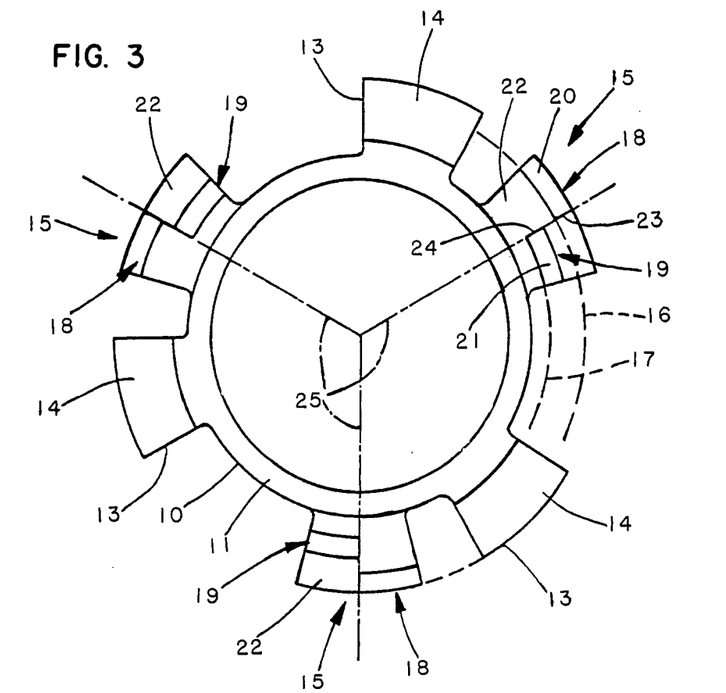
FIG. 3 is a top view of a pipe exhibiting a coupling as shown in FIG. 1.

On pipe 10, close to the contact surface 11, three sets of centering elements 18 and 19 are staggered with respect to one another by 120°. Three elements are arranged along a first orbit 16 (FIG. 3) and three are arranged along a second orbit 17. The centering elements 18, 19 are designed as rectangular pins 20, 21 which in pairs (i.e., pins 20, 21 in each case belonging to two different orbits 16, 17) are arranged integrally on a flange segment 22 and project from it in axial direction (FIG. 1 and 2). The flange segments 22 are arranged so that they are slightly recessed from the contact surface 11. The pins 20, 21, at approximately the same distance, project above the contact surface 11 of the pipe 10. The orbits 16, 17 are arranged concentrically. Their diameters and the radial dimensions of the pins 20, 21 are selected in such a way that the pins 21 on the inside orbit 17 do not intersect the orbit 16.

Each centering element 18, 19 or pin 20, 21 has a centering surface 23, 24 extending at a right angle to the contact surface 11 and in the radial direction. The centering surfaces 23, 24 of the two centering elements 18, 19 arranged on a flange segment 22 are in alignment with one another and are thus located on the same radial alignment line 25. One centering element 18, in this case, is located on one side of the alignment line and the other centering element 19 is located on the other side of the alignment line. The centering elements 19 on the inner orbit 17 are therefore shifted with respect to the element 18 by the arcuate dimension of the centering elements 18 on the orbit 16.

When the second pipe with the identically designed part of the above-described centering device 15 is axially placed on the pipe 10 in the described manner, the flange segments 22 of both pipes are located behind one another when viewed in the axial direction. In each case, the two centering elements 18, 19 or pins 20, 21 belonging to different pipes are arranged behind one another in the radial direction. The radial width of the centering elements 18, 19 or of the pins 20, 21 must be dimensioned in such a way that in the radial direction between the centering elements 18, 19 located behind one another, there remains radial play. The radial play is at least large enough so that during maximal temperature-caused stressing of the pipes, there is no deformation or twisting of the centering elements 18, 19 in the radial direction. In the circumferential direction, in the area of two flange segments 22 of the two pipes that are disposed on top of one another, a total of four centering elements (two centering elements 18 and two centering elements 19) are positioned against one another in such a way that in each orbit 16, 17 two centering surfaces 23, 24 contact one another. In each case, two centering surfaces, 23, 24 of centering elements 18, 19 in contact with one another in the radial direction belong to different pipes. When thermal expansion of the two pipes occurs, the alignment lines 25 remain physically fixed. Since the alignment lines are displaced with respect to one another by 120°, the common axis of the two pipes also remains at rest. Decentering of the pipes with respect to one another because of thermal expansion is thus precluded.

Figure 4:
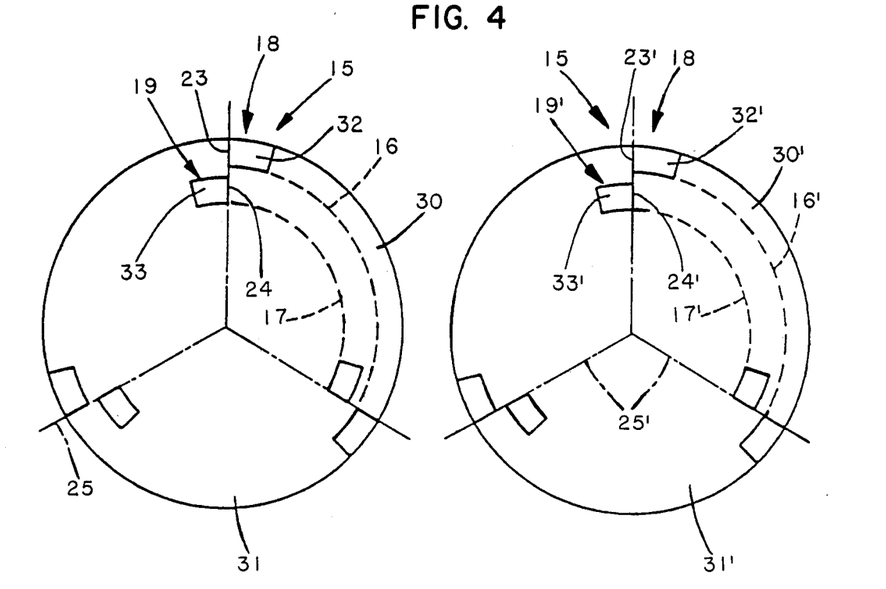
FIGS. 4 and 5 are each top views of two disks that are to be coupled with one another according to different aspects of the present invention.

FIG. 4 shows another embodiment of the centering device 15 for maintaining the centering of two bodies that are coupled with one another which is preferably used in the case of flat bodies. Two disks 30, 30' are to be coupled with one another. Each disk carries an identical part of the centering device 15 (in agreement with the above-mentioned embodiment) at the contact surface 31 and 31'. In this embodiment, three centering elements 18, 19 are arranged in the contact surface 31 and 31' itself. These elements are displaced with respect to one another by 120°, in each case along the first orbit 16 and along the second concentric orbit 17. The centering elements, in this case, are designed as rectangular flat cams 32, 33. They also have centering surfaces 23, 24 again extending at a right angle to the contact surface 31. The centering elements 18, 19 in the two orbits 16, 17 are again shifted with respect to one another in such a way that the centering surfaces 23, 24 in pairs are located along an alignment line 25. Apart from the fact that the centering elements 18, 19 are designed as flat cams 32, 33 and are arranged in the contact surface 31 itself, the design, arrangement and method of operation of the centering elements 18, 19 are identical with those described in connection with FIG. 1–3. In the disk 30' which is designed identically to disk 30, the same elements are marked with a corresponding set of primed reference numbers.

Figure 6:
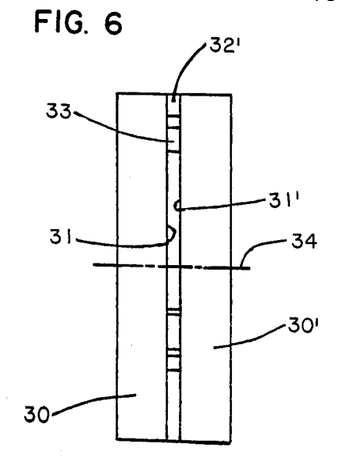
FIGS. 6 and 7 are each a lateral view of the disks in FIGS. 4 and 5 that are coupled with one another.

As shown in FIG. 6, the two disks 30, 30' are placed on top of one another with their contact surfaces 31, 31' facing each other. The flat cams 32, 33 of the disk 30 always lie on the contact surface 31' of the disk 30' and vice versa. Thus a gap remains between the two disks 30, 30' which corresponds to the height of the flat cams 32, 33. The clamp holding the two disks 30, 30' together comprises a connection 34 (e.g., screw) which penetrates the two disks and is shown in FIG. 6 by a dash-dotted line.

Figure 5:
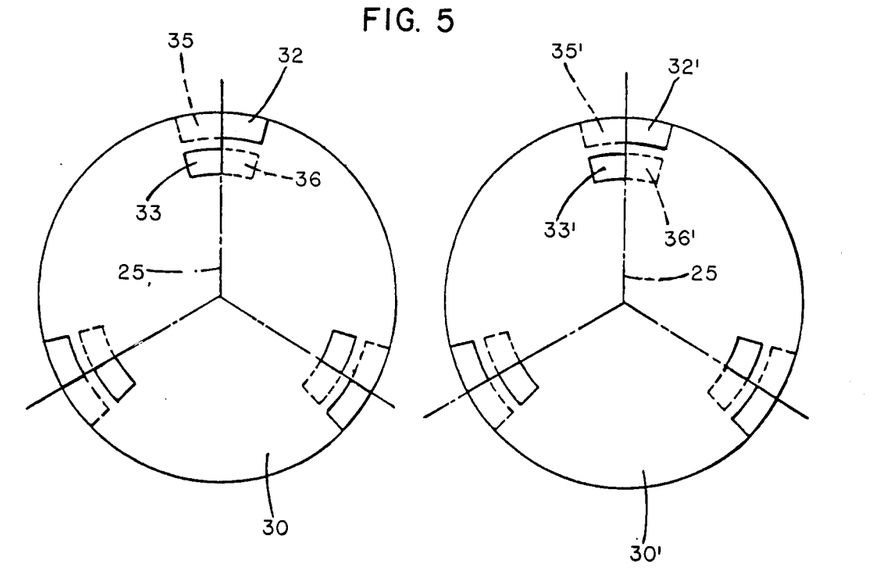
Figure 7:
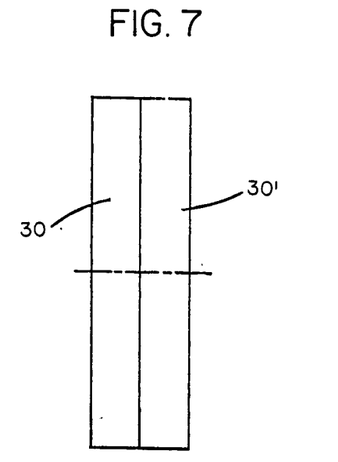

The embodiment according to FIGS. 5 and 7, differs from that of FIGS. 4 and 6 in that for each flat cam 32, 33, a complementary depression 35, 36 is arranged in the contact surface 31. The dimensions of the depressions 35, 36, in axial, radial and tangential direction, are larger by the maximal changes in thermal expansion than the corresponding dimensions of the flat cams 32, 33. The corresponding flat cams 32', 33' of the identically designed second disk 30' project into the depressions 35, 36 and the flat cams 32, 33 of the disk 30 project into corresponding depressions 35' and 36' of the disk 30'. As a result, the contact surfaces 31, 31' of the disks 30, 30' are abutted flatly against one another after connection (FIG. 7). The depressions 35, 36 are designated by dash-dotted lines for the purpose of differentiating them from the flat cams 32, 33.

Figure 8:
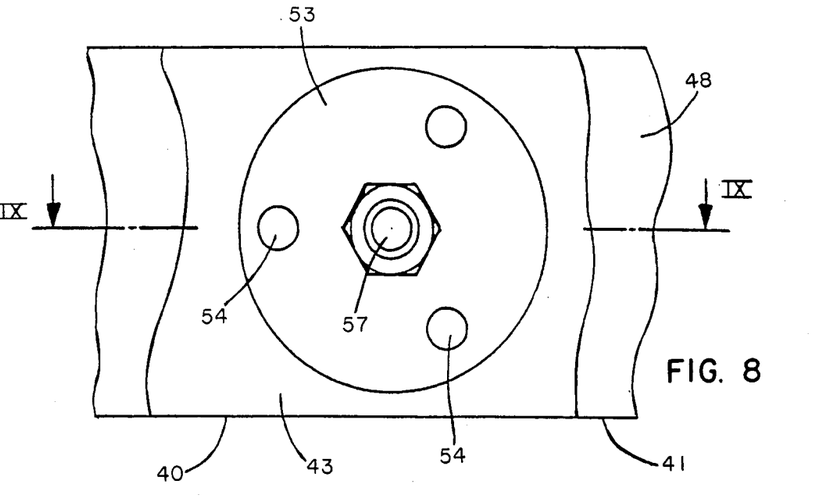
FIG. 8 is a top view of two plates made of different materials that are coupled with one another.
Figure 9:
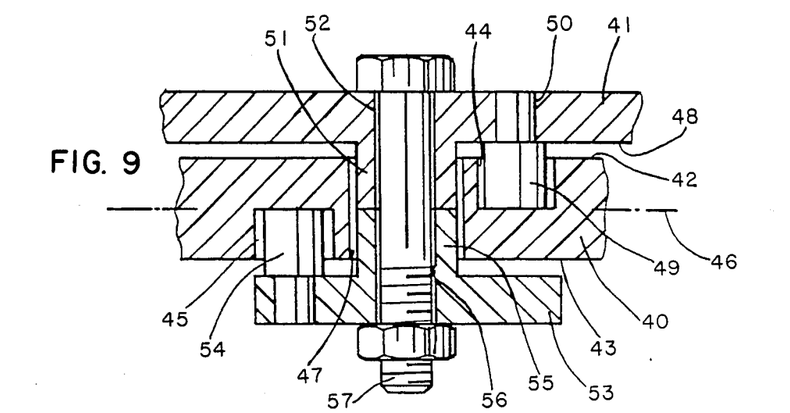
FIG. 9 is a section along line IX—IX in FIG. 8.

A firm axial connection of the disks 30, 30' in FIG. 4 and 5 is not achieved by means of a screwed connection 34 when the disks 30, 30' and the screw connection consist of different materials with different coefficients of thermal expansion and are subjected to temperature fluctuations. In addition to the device 15 that has a centering effect during thermal expansions, in order to also achieve a clamping of flat bodies, such as disks or plates, in an axial direction, an axial clamp is indicated in FIG. 8 and 9. The axial clamp comprises two plates 40, 41 made of materials with different coefficients of thermal expansion. The plate 40 has three depressions 44, 45 on each side 42, 43 that are displaced with respect to one another by 120°. Each depression 44, 45 has a flat bottom located in the center plane 46 of the plate. A bore 47 is provided in the plate centrally with respect to the circle of depressions. The plate 41, consisting of a different material has pins 49 on plate side 48 facing plate side 42 of the plate 40 corresponding to the depressions 44. These pins 49 project from plate side 48 at a right angle and are fastened in bores 50 of the plate 41. The pins 49 are also separated with respect to another by 120°, having positions corresponding to those of the depressions 44. Centrally to the pin circle, the plate 41 has a cylindrical projection 51 projecting at the plate side 48 which is unitary with the plate 41. The projection 51 has a central bore 52. Plate 40 and 41 are fitted together in such a way that the projection 51 engages in the bore 47 and the pin 49 engages the depressions 44, with the front sides of the pins 49, in each case, resting against the bottom of the depressions 44.

A fastening disk 53 is arranged opposite plate side 43 of the plate 40. This fastening disk 53, by means of pins 54 which are designed and arranged identically to the pins 49 of plate 41, engages the depressions 45 by means of a cylindrical projection 55 that is identical to the cylindrical projection 51 engaging the passage bore 47 of the plate 40. The pins 54 again with their front side rest on the bottom of each depression 45, while the projections 51 and 55 abut at the center plane 46 of the plate. The projection 55 also has a central bore 56 which is in alignment with the central bore 52 of the projection 51. The fastening disk 53, via a screwed connection 57 penetrating the central bores 52, 56, is clamped to the plate 41. The pins 49 and 54 contact the bottom of the depressions 44 and 45 and hold the plate 40 tightly to the plate 41. The height of the pins 49, 54 in somewhat greater than the depth of the depressions 44, 45 so that the plate 40, at a narrow distance, is held between the plate 41 and the fastening disk 53. The plate 41, the fastening disk 53 and the screwed connection 57 consist preferably of the same material, such as metal, while the plate 40 consists of a different material, preferably a ceramic.

For the centering of the two plates 40, 41 relative to one another, a centering device 15, as it is shown in FIG. 4 or 5, may be provided between the two plates 40, 41. Between the holes 44, 45 and the pins 49, 54 engaging them, on the one side, and between the passage bore 52 and the projections 51, 55 engaging it, on the other side, a radial play must be provided that permits radial expansions caused by thermal stress. The projections 51, 55 are preferably dimensioned in such a way that they project to the same extent as the pins 49, 54 and thus also abut in the center plane 46 of the plate.

Figure 10:
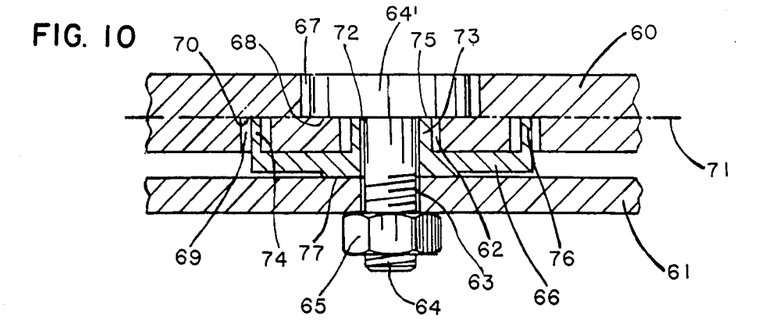
FIG. 10 is the same longitudinal section as in FIG. 9 according to another embodiment.

When the above-described connection of two plates or disks made of materials with different coefficient of thermal expansion are also required to be leakproof, such a coupling must be modified according to the embodiment shown in FIG. 10. In this case, a sealing connection is shown between a ceramic plate 60 and a metal plate 61, the centering connection of which may also be designed according to FIG. 4–7.

The ceramic plate 60 and the metal plate 61 each have a bore 62 and 63. A screwed connection consisting of a screw 64 having a head 64' and a nut 65 is guided through the bores 62, 63. This screwed connection clamps the ceramic plate 60 and the metal plate 61 together while a connecting piece 66 is placed in between. The ceramic plate 60, on the side facing away from the metal plate 61, has a bore 67 that is coaxial to the bore 62 and has a ring surface 68. On the side facing the metal plate 61, plate 60 has a ring groove 69 that is coaxial with the bore 62 and has a ring surface 70 extending on the bottom of the groove. The ring surfaces 68 and 70 are each disposed in one plane, here in the central plane 71 of the plate.

The connecting piece 66 which also has a bore 72 through which screw 64 can be put, has two ring projections 73 and 74 with front-side ring surfaces 75 and 76. These ring projections 73 and 74 are coaxial to the passage bore 72. The ring projections 73 and 74, on the side of the connecting piece 66 facing the ceramic plate 60, project to the same extent. In the case of clamped plates 60, 61, the ring projection 73 projects into the passage bore 62 of the ceramic plate 60 and the ring projection 74 projects into the ring groove 69 in such a way that when the ring surfaces 70 and 76 are placed upon one another, the ring surfaces 68 and 75 are located coaxially and adjacent to one another in the center plane of the plate 71. The ring surfaces 68 and 75, in this case, form a joint contact surface for the screw head 64' of the screw 64.

The metal plate 61 rests on a bearing surface 77 of the connecting piece 66 at a distance from the ceramic plate 60. Surface 77 is provided on the side of the connecting piece 66 facing away from the ring projections 73, 74.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed:

1. A coupling including first and second opposed members clamped to each other by a clamping means, each of said members having a contact surface for contacting one another, each of said members having a series of inner and outer centering elements for centering said members, each of said centering elements having only one centering surface extending outwardly relative to a central region of said member and transversely relative to said contact surface, said inner centering elements of said first member being disposed inside said outer centering elements of said second member, said outer centering elements of said first member being disposed outside said inner centering elements of said second member, said centering surface of each said inner centering element of said first member being disposed to abut said centering surface of only one adjacently disposed inner centering element of said second member, said centering surface of each said outer centering element of said first member being disposed to abut said centering surface of only one adjacently disposed outer centering element of said second member, each of said centering elements having remaining transversely extending surfaces in addition to said centering transversely extending surface, said remaining transversely extending surfaces of one member being separated sufficiently in a radial and circumferential direction with respect to adjacent remaining transversely extending surface of the centering element of the other member to allow for expansion without deformation of said centering elements when said coupling is at a maximum operating temperature.

2. A coupling according to claim 1, wherein each said inner centering element of said first member disposed inside said outer centering element of said second member is separated from said outer centering element of said second member by a preselected distance, and each said outer centering element of said first member disposed outside said inner centering element of said second member is separated from said inner centering element of said second member by said preselected distance, said preselected distance being at least great enough to prevent radial deformation of said inner and outer elements when said elements are at said maximum operating temperature.

3. A coupling according to claim 1, wherein a member and said centering elements of said member comprise the same material.

4. A coupling according to claim 3, wherein said centering elements are unitary with said member.

5. A coupling according to claim 1, wherein said clamping means comprising axial clamping means for axially clamping said contact surfaces of said first and second opposed members together.

6. A coupling according to claim 1, wherein said first opposed member has at least three inner centering elements and at least two outer centering elements.

7. A coupling according to claim 1, wherein said first opposed member has at least three outer centering elements and at least two inner centering elements.

8. A coupling according to claim 7, wherein said first opposed member has three outer centering elements and three inner centering elements.

9. A coupling according to claim 1, wherein said series of inner centering elements of said first opposed member are disposed on said first opposed member with an equal angular separation relative to a longitudinal axis of said opposed member, one said outer centering element being disposed adjacent each said inner centering element.

10. A coupling according to claim 9, wherein said opposed members comprise cylinder means.

11. A coupling according to claim 10, wherein said first opposed member has three inner centering elements and three outer centering elements, said inner centering elements being disposed on said first opposed member at an angular separation of 120°.

12. A coupling according to claim 1, wherein each said centering element comprises flange means disposed adjacent a peripheral portion of said opposed member.

13. A coupling according to claim 12, wherein said flange means comprise pin means having rectangular cross sections.

14. A coupling according to claim 13, wherein said first and second opposed members comprise hollow cylindrical members.

15. A coupling according to claim 14, wherein said flange means are unitary with said opposed members, and said flange means extend outwardly from said opposed members.

16. A coupling according to claim 15, wherein said first and second opposed members each have three flange means and said flange means are disposed at an angular separation of 120° relative to a longitudinal axis of said cylindrical member.

17. A coupling according to claim 14, wherein said pin means project transversely from said contact surface.

18. A coupling according to claim 1, wherein said centering elements are disposed in said contact surface.

19. A coupling according to claim 18, wherein said centering elements comprise substantially flat cam means extending transversely from said contact surfaces.

20. A coupling according to claim 19, wherein each said contact surface has a complementary depression for receiving each said flat cam means, said depressions having a depth greater than or equal to a distance said cam means project above said contact surface when said coupling is at said maximum operating temperature.

21. A coupling according to claim 5, wherein said clamping means comprises:
first plate means having first and second sides, each of said plate sides exhibiting at least two depressions,
second plate means having pin means for engaging said depressions in said first plate side of said first plate,
fastening disc means having pin means for engaging said depressions in said second plate side of said first plate, and
fastening means for fastening said first and second plates and said fastening disc together.

22. A coupling according to claim 21, wherein said fastening means comprises threaded connecting means.

23. A coupling according to claim 21, wherein each said first and second plate sides of said first plate exhibit three said depressions.

24. A coupling according to claim 21, wherein said depressions on each said plate side are arranged in a circle with equal angular separation.

25. A coupling according to claim 23, wherein said fastening means is disposed at a center of said circle.

26. A coupling according to claim 21, wherein depressions comprise cylindrical holes extending halfway through said first plate means.

27. A coupling according to claim 26, wherein said pin means comprise cylindrical pins, said cylindrical depressions having a diameter at least as great as a diameter of said cylindrical pins when said coupling is exposed to a maximum operating temperature.

28. A coupling according to claim 21, wherein said fastening disc and said second plate means comprise the same material.

29. A coupling according to claim 25, wherein said second plate means and said fastening disc have hollow cylindrical projections extending through a central bore in said first plate means, said fastening means passing through said hollow cylindrical projections.

30. A coupling according to claim 5, wherein said axial clamping means comprises:
first plate means having a circular depression on one side and a coaxial annular groove on another side, said plate having a bore extending therethrough, said bore having a diameter smaller than said circular depression and being concentric with said circular depression,
second plate means having a bore extending therethrough,
connecting piece means having large and small coaxial circular projections and a bore inside said small coaxial circular projections,
said smaller circular projection capable of engaging said bore in said first plate, said large circular projection capable of engaging said annular groove in said first plate, and
fastening means for fastening said first and second plates to said connecting piece means, said fastening means passing through said bores in said first and second plate means and said bore inside said small circular projection in said connecting piece means, said fastening means having a head which engages said depression in said first plate means.

31. A coupling according to claim 1, wherein said centering surface of an inner centering elements and of a corresponding outer centering elements are coplanar and said corresponding centering elements extend in opposite transverse direction from said centering surface plane.

* * * * *